United States Patent
Wu et al.

(10) Patent No.: US 7,955,529 B2
(45) Date of Patent: Jun. 7, 2011

(54) SYNTHESIS FOR CATALYSIS OF BIFUNCTIONAL PEROVSKITE COMPOUND

(75) Inventors: Pu-Wei Wu, Hsinchu (TW); Yun-Min Chang, Taipei (TW)

(73) Assignee: National Chiao Tung University (TW)

( * ) Notice: Subject to any disclaimer, the term of this patent is extended or adjusted under 35 U.S.C. 154(b) by 85 days.

(21) Appl. No.: 12/453,286

(22) Filed: May 6, 2009

(65) Prior Publication Data
US 2010/0140569 A1 Jun. 10, 2010

(30) Foreign Application Priority Data
Dec. 9, 2008 (TW) ................................ 97147743 A

(51) Int. Cl.
*H01B 1/08* (2006.01)
*C04B 35/057* (2006.01)
*B01J 23/02* (2006.01)
*B01J 23/10* (2006.01)

(52) U.S. Cl. ............ 252/519.13; 252/519.15; 252/521.1; 501/123; 501/126; 501/152; 423/21.1; 423/22; 502/105; 502/104; 502/117; 502/303; 502/525

(58) Field of Classification Search ............. 252/519.13, 252/519.15, 521.1; 501/123, 126, 152; 423/21.1, 423/22; 502/105, 104, 117, 303, 525
See application file for complete search history.

(56) References Cited

U.S. PATENT DOCUMENTS

| 7,585,474 B2 * | 9/2009 | Wong et al. ................. 423/1 |
| 2005/0249653 A1 * | 11/2005 | Tanaka et al. ............... 423/263 |
| 2010/0227759 A1 * | 9/2010 | Tanaka et al. ............... 502/327 |

OTHER PUBLICATIONS

Chang, Yun-Min, et al., "Mechanical Alloying Preparation of La0.6Ca0.4CoIr0.25O3.5-x, as a Bifunctional Electrocatalyst in Alkaline Electrolyte", Electrochem. Solid-State Lett., 11(4), B47-B50, published Jan. 28, 2008 (Abstract Only).*

Chang, Yun-Min, et al., "Mechanical Alloying Preparation of La0.6Ca0.4CoIr0.25O3.5-x, as a Bifunctional Electrocatalyst in Alkaline Electrolyte", Electrochem. Solid-State Lett., 11(4), B47-B50, published Jan. 28, 2008.*

Chang et al., Yun-Min; Enhancement of bifunctional catalysis by Ir doping of $La_{0.6}Ca_{0.4}CoO_3$ perovskites, Material Letters 62, 2008, 4220-4222, Elsevier B.V.

* cited by examiner

*Primary Examiner* — Douglas Mc Ginty
(74) *Attorney, Agent, or Firm* — Bacon & Thomas, PLLC

(57) ABSTRACT

This invention discloses the synthesis of a bifunctional $La_{0.6}Ca_{0.4}Co_{1-x}Ir_xO_3$ (x=0~1) perovskite compound with a superb bifunctional catalytic ability for the oxygen reduction and generation in alkaline electrolytes. Synthetic routes demonstrated include solid state reaction, amorphous citrate precursor, and mechanical alloying. The interested compound demonstrates notable enhancements over commercially available $La_{0.6}Ca_{0.4}CoO_3$.

11 Claims, 8 Drawing Sheets

SYNTHESIS FOR CATALYSIS OF BIFUNCTIONAL PEROVSKITE COMPOUND

BACKGROUND OF THE INVENTION

1. Field of the Invention

The invention discloses the synthesis of a bifunctional perovskite compound, particularly to the synthesis of a bifunctional perovskite compound used as the cathode of fuel cell.

2. Description of the Prior Art

The fuel cell has been recognized as green environmental energy with excellent development potential in the 21st century. As for the research of fuel cell at present, the main research direction is the Proton Exchange Membrane Fuel Cell (PEMFC) and the Direct Methanol Fuel Cell (DMFC). In the PEMFC system, the anode uses hydrogen as the reactant. The source of hydrogen is mainly from the natural gas. Even though the conversion rate is high, there are still storage problems. In the DMFC system, the serious diffusion of methanol will shorten the life of cell. The conversion rate is low and the anodic platinum catalyst is easy to be poisoned by the carbon monoxide. These problems should be solved urgently. As for the comparison, the alkaline fuel cell has been successfully used in the electronic produce with low power consumption, due to the advantages, such as simple structure, high energy density, stable performance, high electricity generation efficiency and low environmental impact etc.

In the alkaline fuel cell system, the cathode is oxygen diffusion electrode, and the electrolyte is the alkaline solution, such as potassium hydroxide etc. Compared to the acid electrolytic solution system, the reduction rate of oxygen is faster in the alkaline electrolytic environment. In addition, the corrosion rate of metal is much lower under the alkaline solution compared to the acid solution as well. Thus, non-platinum system can be used as the catalyst to reduce the cost, which is the greatest advantage for the alkaline fuel cell. Compared to the anode, the cathode has larger electric current and potential when the electrochemical reaction takes place. Thus, the quality of cathodic air electrode plays a very important role.

In many previous literatures, it is known that many kinds of catalyst can be used for accelerating the oxygen reduction, wherein the platinum or platinum alloy has the highest reduction efficiency. However, due to the price of platinum is too expensive and the selectivity of platinum is too low, so that the research trend is towards to look for the catalyst which can substitute the platinum and can own high catalysis activity, such as the perovskites, spinels, pyrochlores, metal chelating compound, metal or metal and metal oxide mixture.

In various catalysts, the research of perovskites is paid much more attention. It has been understood that the perovskites own good catalysis property in the oxygen reduction condition. On the other side, in 2005, S. Trasatti et al. discovered that the ruthenium tin oxide alloy had there is remarkable oxygen generation ability in the electrochemical reaction. One of the improvement trends is to develop a catalyst with good electrochemical effect for the oxidization and reduction of oxygen at the same time, and can be applied to the rechargable alkaline fuel cell and various metal air cells.

SUMMARY OF THE INVENTION

The invention discloses the application of a catalyst and its cathodic air electrode, and the synthesis of a bifunctional $La_{0.6}Ca_{0.4}Co_{1-x}Ir_xO_3$ (x=0~1) perovskite compound with a superb bifunctional catalytic ability for forming as the cathodic air electrode.

Moreover, the invention discloses the application of a bifunctional perovskite compound with a superb bifunctional catalytic ability for the oxygen reduction, oxidization and the cathodic air electrode for forming as the cathodic air electrode.

According to the above-mentioned description, the synthesis of a perovskite compound comprises the following steps:

Dissolve lanthanum nitrate, calcium nitrate, cobalt nitrate and iridium chloride in water respectively to form a plurality of aqueous solutions; Mix up and agitate these aqueous solutions to form a mixture; Prepare a saturated citric acid aqueous solution, wherein the citric acid and total metal ion have the same moles; Mix up the mixture and the saturated citric acid aqueous solution; Heat up the mixture and the saturated citric acid aqueous solution to form a metal sol; Dry up the metal sol; Grind up the dry metal sol to obtain a precursor powder; Heat up the precursor powder; and cool down the precursor powder.

The synthesis of a perovskite compound comprises the following steps:

Mix up lanthanum nitrate, calcium nitrate, cobalt nitrate and iridium chloride powders to form a powder mixture; Sinter up the powder mixture; Cool down the sintered powder mixture; Dry up the powder mixture; Heat up the powder mixture; and cool down the powder mixture.

The advantage and spirit of the invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The method for the synthesis of a perovskite compound of the invention is described in detail as follows:

1. Prepare the Perovskite Compound with Different Chemical Dosage:

In the invention, change the element at Site B in the perovskite ($ABO_3$) structure firstly. In the amorphous citrate precursor (ACP) process, weigh required proportion of chemical dosage of lanthanum nitrate, calcium nitrate, cobalt nitrate and iridium chloride powders, dissolve them in water respectively, mix up the above aqueous solutions uniformly and agitate it for 1 hour. This is solution a. On the other hand, prepare a saturated citric acid aqueous solution, wherein the citric acid and total metal ion have the same moles (citric acid:metal ion=1:1). Add the above solution a slowly and agitate it. Then, heat up the solution to 100° C. for 6 hours to form the metal sol. Put upon the sol in a 70° C. oven to dry it for a day. Grind up to obtain the precursor powder. Under the air atmosphere and 5° C. per minute of temperature rising rate, heat up the precursor powder to 650° C. for 4 hours. Cool down to room temperature in the oven. Grind up and filter it to obtain the perovskite compound, and the general chemical formula is $La_{0.6}Ca_{0.4}Co_{1-x}Ir_xO_3$ (x=0~1).

In another preferred embodiment, the solid state reaction method (SSRM) is employed. Weigh lanthanum nitrate, calcium nitrate, cobalt nitrate and iridium chloride powders in accordance with required proportion and mix up them uniformly. Under the air atmosphere and 5° C. per minute of temperature rising rate, sinter up the powder mixture at 600° C. for 4 hours in the tube furnace. Cool down to the room temperature at about 25° C. Grind up and filter it. Under the air atmosphere and 5° C. per minute of temperature rising rate, sinter up it at 800° C. for 4 hours in the tube furnace again. Cool down it to the room temperature in the furnace. Grind up and filter it to obtain the perovskite compound, and the general chemical formula is $La_{0.6}Ca_{0.4}Co_{1-x}Ir_xO_3$ (x=0~1).

In another preferred embodiment, the Mechanical Alloying (MA) method is employed. Firstly, the amorphous citrate precursor method is used to synthesize the $La_{0.6}Ca_{0.4}CoO_3$ powder. Then, weigh the $La_{0.6}Ca_{0.4}CoO_3$ and iridium chloride powders in accordance with required proportion and mix up them uniformly. Grind up the powder mixture in a star-type high-energy ball mill with constant revolution for 12 hours. Filter it to obtain the perovskite compound, and its general chemical formula is $La_{0.6}Ca_{0.4}CoIr_{0.25}O_{3.5-\delta}$.

Figure 1A:
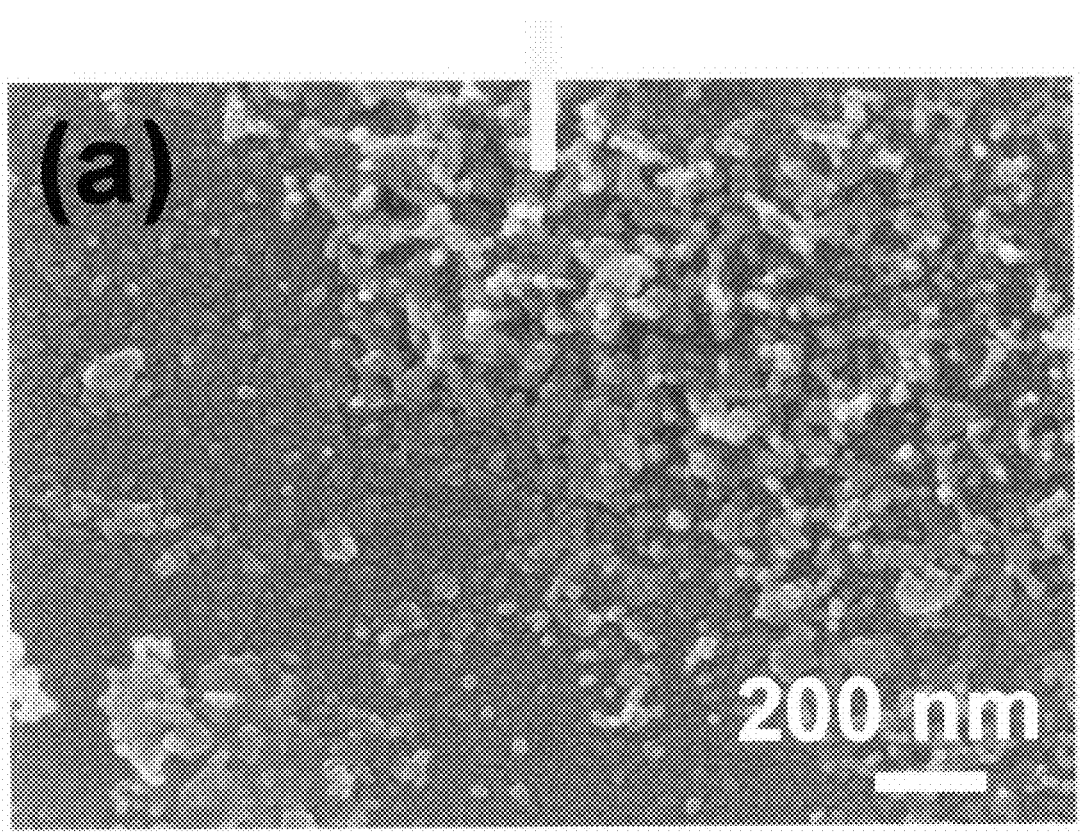
FIG. 1(a) shows the SEM diagram of $La_{0.6}Ca_{0.4}Co_{0.8}Ir_{0.2}O_3$ catalyst powder synthesized by the ACP.

FIG. 1(a) shows the scanning electron microscope (SEM) diagram of $La_{0.6}Ca_{0.4}Cu_{0.8}Ir_{0.2}O_3$ catalyst powder synthesized by the ACP. The particle is slightly irregular sphere, and the distribution of particle diameter lies between 15 nm to 50 nm.

Figure 1B:
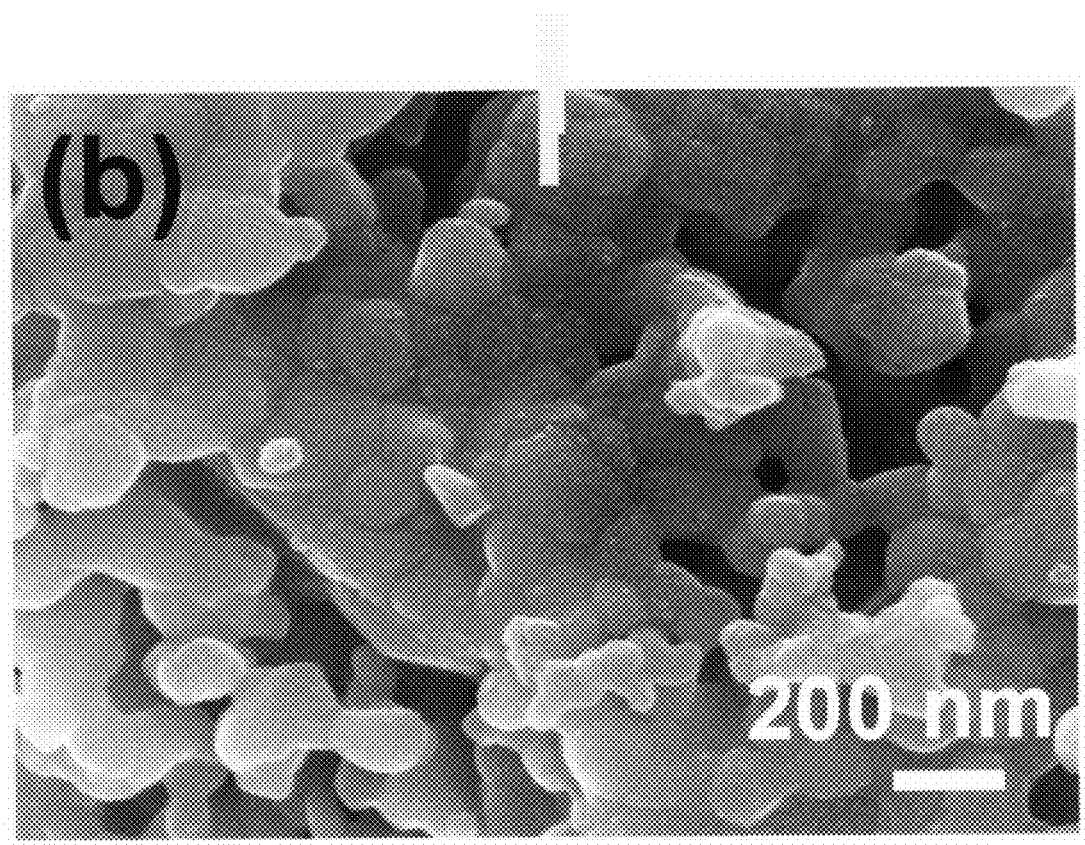
FIG. 1(b) shows the SEM diagram of $La_{0.6}Ca_{0.4}Co_{0.8}Ir_{0.2}O_3$ catalyst powder synthesized by the SSRM.

FIG. 1(b) shows the SEM diagram of $La_{0.6}Ca_{0.4}Co_{0.8}Ir_{0.2}O_3$ catalyst powder synthesized by the SSRM. The particle size is about 500 nm, because it is sintered at 600° C. for 4 hours and at 800° C. for 4 hours.

Figure 1C:
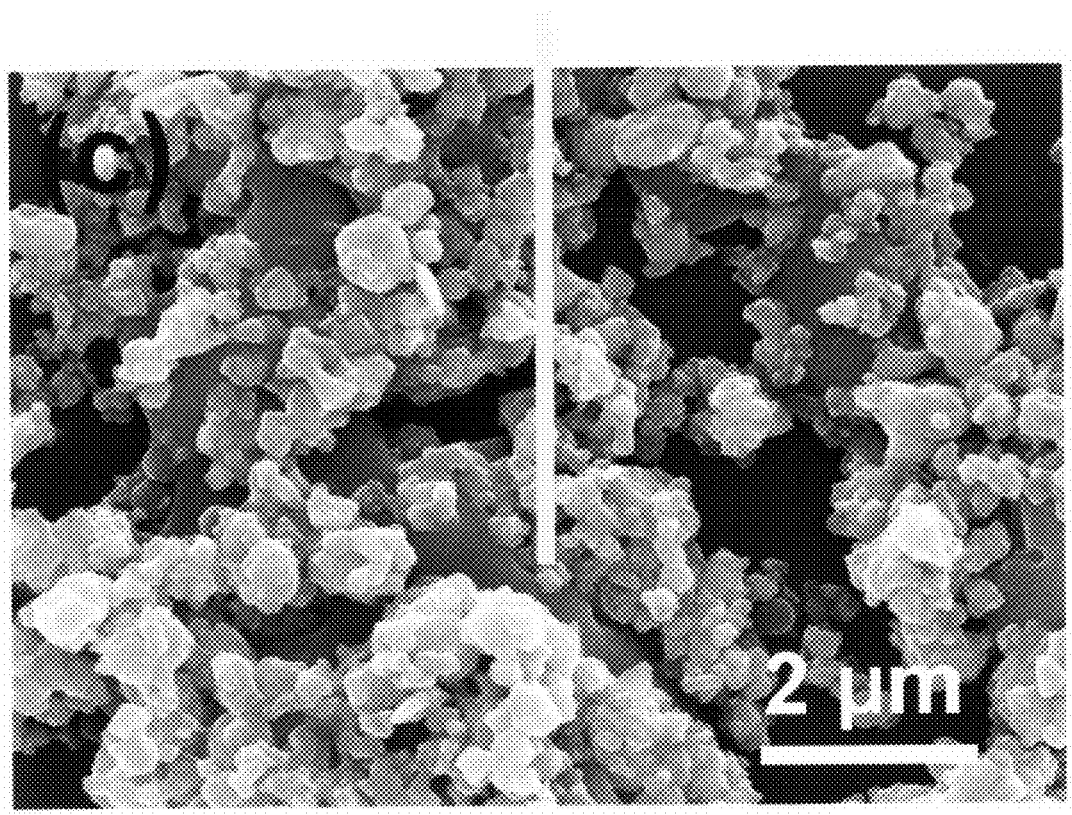
FIG. 1(c) shows the SEM diagram of $La_{0.6}Ca_{0.4}CoIr_{0.25}O_{3.5-\delta}$ catalyst powder ground by the MA.

FIG. 1(c) shows the SEM diagram of $La_{0.6}Ca_{0.4}CoIr_{0.25}O_{3.5-\delta}$ catalyst powder ground by the MA. The irregular particle can be observed in the figure clearly. The particle size is about 300 nm to 500 nm, and the particles are aggregated together. Before grinding, the particle size of $La_{0.6}Ca_{0.4}CoO_3$ and $IrO_2$ is 10~30 nm and 100~200 nm, respectively. Thus, after high-energy grinding, the particle size is grown slightly.

2. Preparation of the Catalyzed Air Electrode:

Employ a homo mixer to mix 30 wt % of catalyst powder, 30 wt % of polytetrafluoroethylene (PTFE), 30 wt % of carbon nanocapsules (CNCS) and 10 wt % of polyvinyl alcohol (PVA) in 10 mL deionized water uniformly. Agitate it for 5 minutes to get an uniform slurry. Coat it on an air diffusion layer evenly. Then, in order to remove the residual solvent, put the electrode in a 350° C. furnace for minutes. After heat treatment, roll the electrode to about 0.3 µm thick to get the working electrode for electrochemical measurement.

Then, the electrochemical measurement is conducted by a cell with 3 electrodes, wherein the working electrode is the air electrode, the auxiliary electrode is the titanium net coated with ruthenium oxide and iridium oxide, the reference electrode is the zinc bar, and the electrolyte is 30 wt % of potassium hydroxide (KOH). In the polarization curve test of current versus potential, increase the output of current gradually (1 mA/sec) and measure the corresponding output of potential. In the curve, the polarization phenomenon demonstrates the polar property of electrode deviated from the ideal electrode, which can be used to judge whether the property of catalyzed electrode is good or bad.

Figure 2:
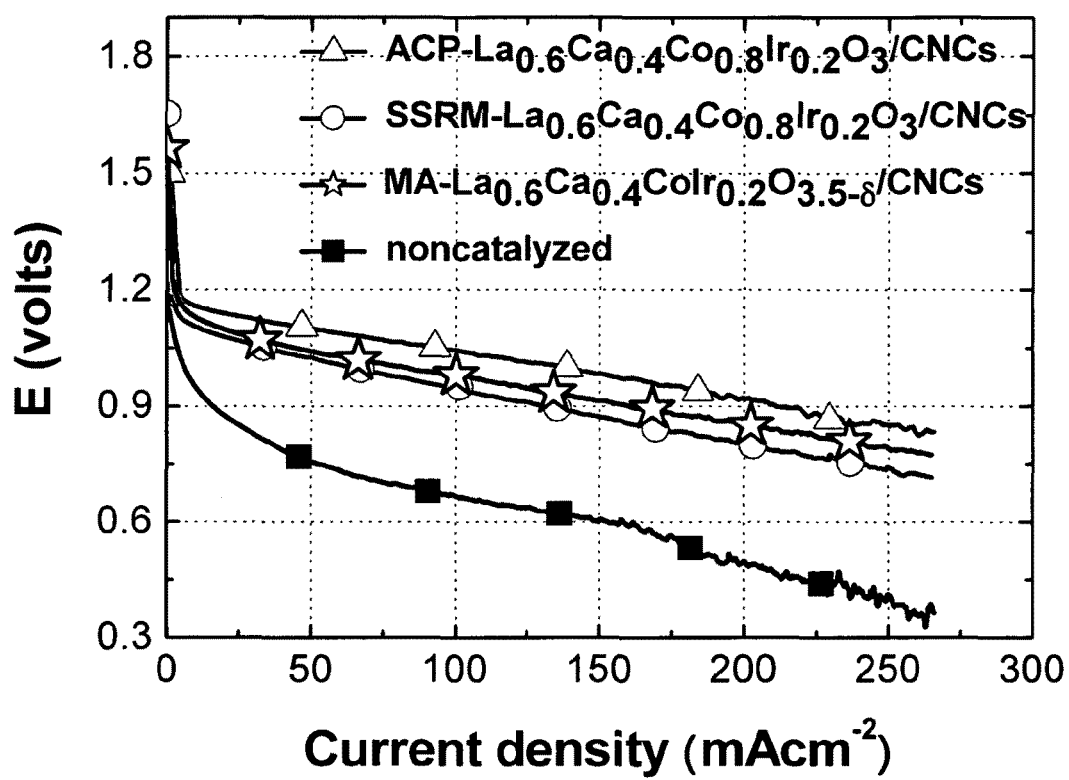
FIG. 2 shows the polarization curves of potential versus current density for $La_{0.6}Ca_{0.4}Co_{0.8}Ir_{0.2}O_3$ catalyst powder synthesized by the ACP (ACP-$La_{0.6}Ca_{0.4}Co_{0.8}Ir_{0.2}O_3$/CNCs), $La_{0.6}Ca_{0.4}Co_{0.8}Ir_{0.2}O_3$ catalyst powder synthesized by the SSRM (SSRM-$La_{0.6}Ca_{0.4}Co_{0.8}Ir_{0.2}O_3$/CNCs), and $La_{0.6}Ca_{0.4}CoIr_{0.25}O_{3.5-\delta}$ catalyst powder ground by the MA (MA-$La_{0.6}Ca_{0.4}CoIr_{0.25}O_{3.5-\delta}$/CNCs).

FIG. 2 shows the polarization curves of potential versus current density for $La_{0.6}Ca_{0.4}Co_{0.8}Ir_{0.2}O_3$ catalyst powder synthesized by the ACP (ACP-$La_{0.6}Ca_{0.4}Co_{0.8}Ir_{0.2}O_3$/CNCs), $La_{0.6}Ca_{0.4}Co_{0.8}Ir_{0.2}O_3$ catalyst powder synthesized by the SSRM (SSRM-$La_{0.6}Ca_{0.4}Co_{0.8}Ir_{0.2}O_3$/CNCs), and $La_{0.6}Ca_{0.4}CoIr_{0.25}O_{3.5-\delta}$/catalyst powder ground by the MA (MA-$La_{0.6}Ca_{0.4}CoIr_{0.25}O_{3.5-\delta}$/CNCs). Three catalysts are used to make air electrodes, and CNCs is used as the carrier. In addition, the noncatalyzed air electrode is used to get the background value. In these four electrodes, the ACP-$La_{0.6}Ca_{0.4}Co_{0.8}Ir_{0.2}O_3$/CNCs demonstrates the highest catalytic ability. For example, it still keeps 1.065 V of potential under 100 mA/cm² of current density. It is worthy to note that the polarization curve drops sharply for the electrode without $La_{0.6}Ca_{0.4}Co_{0.8}Ir_{0.2}O_3$ catalyst. It proves the presence of perovskite compound can improve the electrochemical performance significantly.

Figure 3:
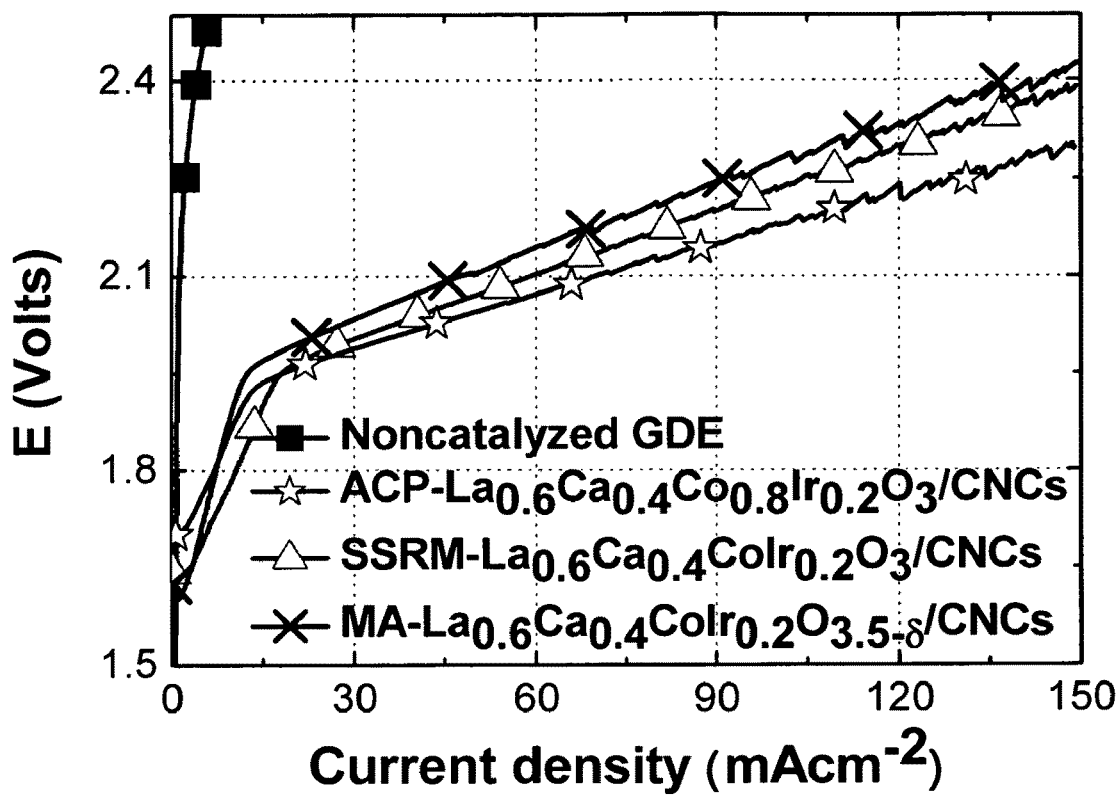
FIG. 3 shows the polarization curves of ACP-$La_{0.6}Ca_{0.4}Co_{0.8}Ir_{0.2}O_3$/CNCs, SSRM-$La_{0.6}Ca_{0.4}Co_{0.8}Ir_{0.2}O_3$/CNCs, and MA-$La_{0.6}Ca_{0.4}CoIr_{0.25}O_{3.5-\delta}$/CNCs) under charging.

FIG. 3 shows the polarization curves of ACP-$La_{0.6}Ca_{0.4}Co_{0.8}Ir_{0.2}O_3$/CNCs, SSRM-$La_{0.6}Ca_{0.4}Co_{0.8}Ir_{0.2}O_3$/CNCs, and MA-$La_{0.6}Ca_{0.4}CoIr_{0.25}O_{3.5-\delta}$/CNCs) under charging. Three catalysts are used to make air electrodes, and CNCs is used as the carrier. In addition, the noncatalyzed air electrode is used to get the background value. Compared to the discharge polarization curves, in the mechanism of charging reaction, the OH⁻ in the solution reacts with the catalyst on the interface of electrode to form oxygen mainly and the oxygen passes through the electrode into air. The electrode is apt to be destroyed because the oxygen is generated on the interface of electrode and has to diffuse to the atmosphere through the electrode. Thus, generally speaking, under the same current, the slope of oxidization curve under charging will be much higher than that of reduction curve. At the initial steady state, the potential is maintained at about 1.4 V steadily. When the power is switched on, the potential rises to 1.6 V sharply. And then the potential is risen at about 45° degree corresponding to the increase of current for catalyzed electrode. On the other hand, the potential is risen at about 90° degree corresponding to the increase of current for noncatalyzed electrode.

Then, the charge or discharge experiment is conducted. The same cell with 3 electrodes is used. In the experiment, measure the charge and discharge ability of air cathode under constant current, The range of current is 5 mA/cm$^2$ to 200 mA/cm$^2$, and the stability for output value of potential is observed.

Figure 4:
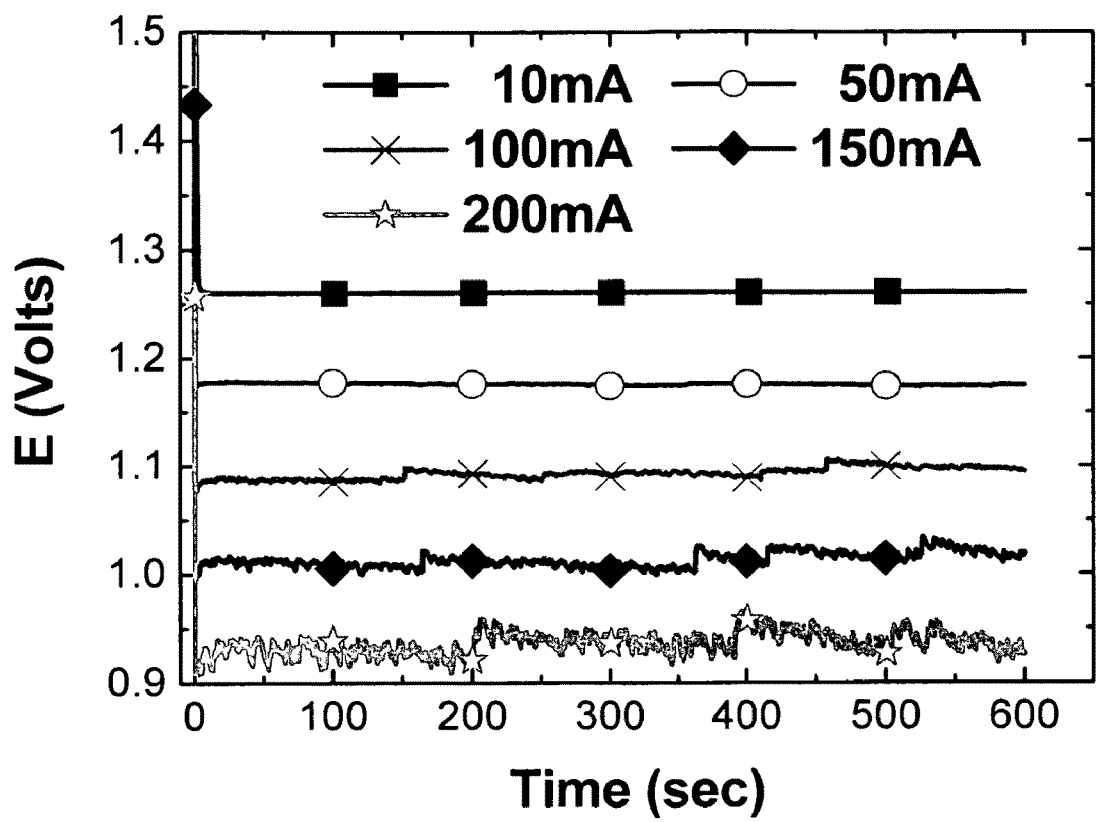
FIG. 4 shows the curves of potential versus time for ACP-$La_{0.6}Ca_{0.4}Co_{0.8}Ir_{0.2}O_3$/CNCs under 10 mA/cm$^2$, 50 mA/cm$^2$, 100 mA/cm$^2$ and 200 mA/cm$^2$ of current density.

FIG. 4 shows the curves of potential versus time for ACP-La$_{0.6}$Ca$_{0.4}$Co$_{0.8}$Ir$_{0.2}$O$_3$/CNCs. The current density is kept at 10 mA/cm$^2$, 50 mA/cm$^2$, 100 mA/cm$^2$ and 200 mA/cm$^2$, respectively. After it is discharged for 10 minutes continuously, the discharge curve is very stable. The curve presents slightly sawtooth shape under high current density, due to the influence of oxygen supply. But the curves are still kept at nearly horizontal and stable state macroscopically. In addition, charge it continuously for 10 minutes at constant current density of 5 mA/cm$^2$, 10 mA/cm$^2$, 30 mA/cm$^2$, 50 mA/cm$^2$ and 100 mA/cm$^2$.

Figure 5:
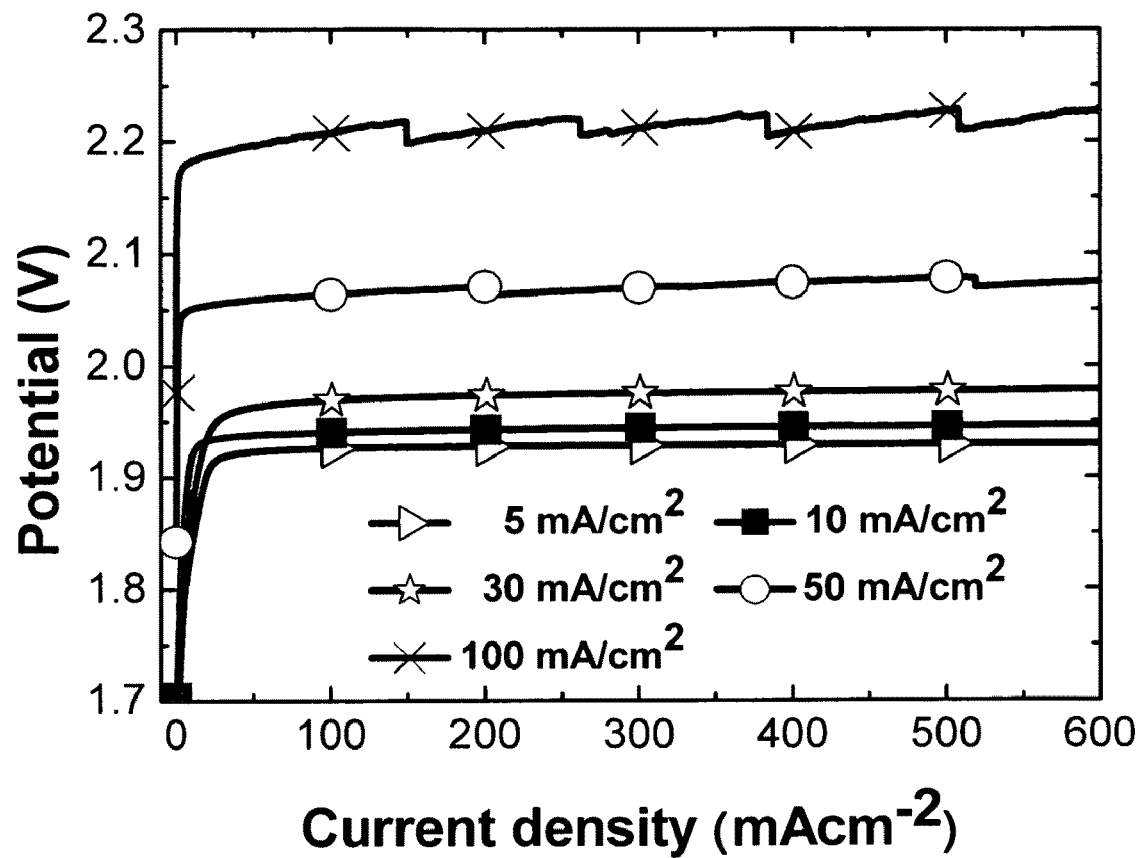
FIG. 5 shows the curves of potential versus time for ACP-$La_{0.6}Ca_{0.4}Co_{0.8}Ir_{0.2}O_3$ under different discharge current density.

FIG. 5 shows a nearly steady state is kept under different current density. Meantime, the result meets the measurement result in FIG. 3.

Figure 6:
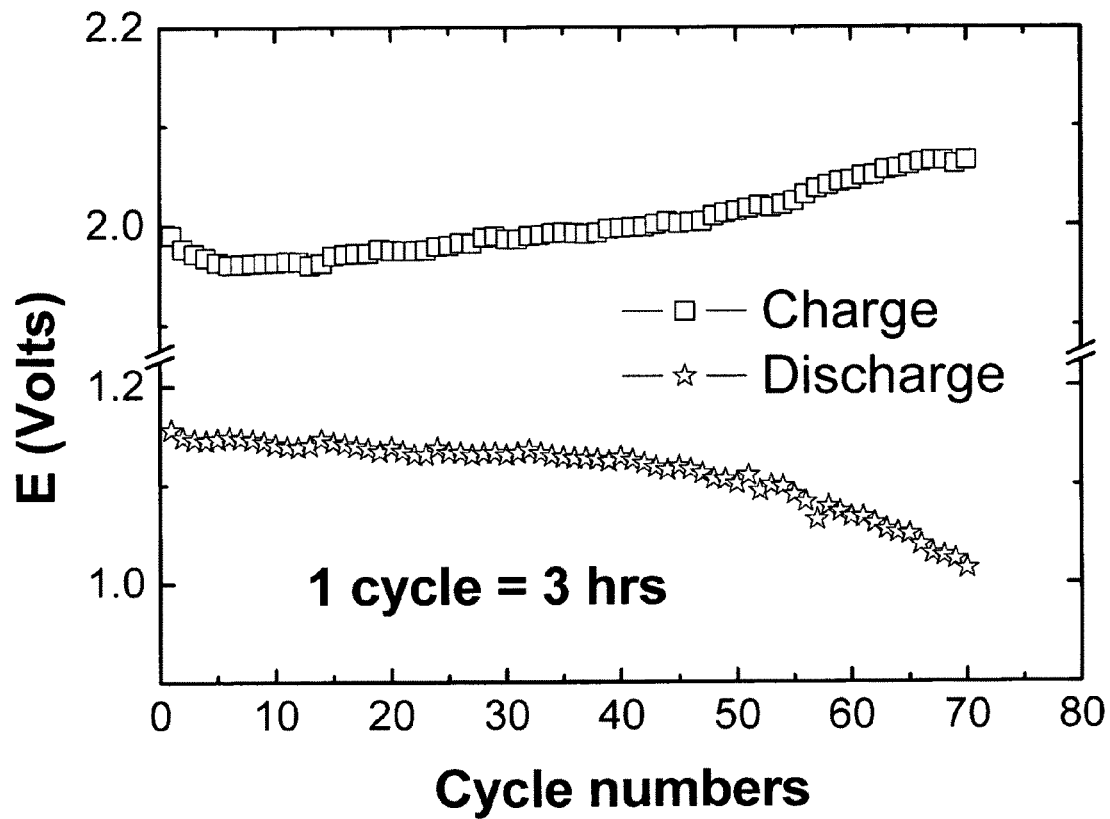
FIG. 6 shows the curves of potential versus cycle numbers for ACP-$La_{0.6}Ca_{0.4}Co_{0.8}Ir_{0.2}O_3$ under continuous charge and discharge state.

In order to prove the bifunctional property of ACP-La$_{0.6}$Ca$_{0.4}$Co$_{0.8}$Ir$_{0.2}$O$_3$/CNCs, a cyclic test is conducted and the result is shown in FIG. 6. A cycle consists of half an hour of discharge, an hour of rest, half an hour of charge and an hour of rest. At the first 5 cycles, the potential is dropped slightly. In addition, when the measurement reaches 70 cycles, the potential is increased steadily and slowly. The potential is increased 1.59 mV per cycle. The potential is increased to 2.08 V at the 70th cycle. On the other hand, the potential drop presents a steady curve at discharge state. During 70 cycles, two sections of slope are presented. The first section is 1~40 cycles, and the slope is 0.61 mV/cycle. The second section is 41~70 cycles, and the slope is 4.24 mV/cycle. The potential is kept at 0.97 V at the 70th cycle. Thus, the flat charge and discharge curves can be obtained, and the conversion efficiency of electrochemical energy can be improved for 4.1%, which is raised for 32%.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable bifunctionality that reside in the present invention, including all features that would be treated as equivalents thereof by those skilled in the art to which this invention pertains.

What is claimed is:

1. A method for synthesizing a bifunctional perovskite compound, comprising:

dissolving respectively a lanthanum nitrate, a calcium nitrate, a cobalt nitrate and a iridium chloride in water to form an aqueous solution;

mixing and agitating the plurality of aqueous solutions to form a mixture;

preparing a saturated citric acid aqueous solution, wherein the saturated citric acid and a plurality of metal ions having the same moles;

mixing the mixture and the saturated citric acid aqueous solution;

heating the mixture and the saturated citric acid aqueous solution to form a metal sol;

drying the metal sol;

grinding the dry metal sol to obtain a precursor powder;

heating the precursor powder; and cooling the precursor powder to prepare the perovskite compound.

2. The method according to claim 1, wherein the chemical composition of perovskite compound comprises La$_{0.6}$Ca$_{0.4}$Co$_{1-x}$Ir$_x$O$_3$ (0<X<1).

3. The method according to claim 1, wherein the mixing and agitation time for a plurality of aqueous solutions comprises more than 1 hour.

4. The method according to claim 1, wherein the mixture solution and the saturated citric acid aqueous solution comprises heating to temperature 100° C. about more than 6 hours.

5. The method according to claim 1, wherein the metal sol comprises drying in at about temperature 70° C. oven for more than a day.

6. The method according to claim 1, wherein the precursor powder comprises heating to temperature 650° C. for more than 4 hours.

7. A method for synthesizing a bifunctional perovskite compound, comprising:

mixing lanthanum nitrate, calcium nitrate, cobalt nitrate and iridium chloride powders to form a powder mixture;

sintering the powder mixture to form a sintered powder mixture;

cooling the sintered powder mixture;

heating the sintered powder mixture; and cooling the powder mixture to prepare the perovskite compound.

8. The method according to claim 7, wherein the chemical composition of perovskite compound comprises La$_{0.6}$Ca$_{0.4}$CoIr$_{0.25}$O$_{3.5-\delta}$.

9. The method according to claim 7, wherein the powder mixture comprises sintering at temperature 600° C. for more than 4 hours under the air atmosphere and having 5° C. per minute of temperature rising rate.

10. The method according to claim 7, wherein the powder mixture comprises heating to temperature 800° C. for more than 4 hours.

11. The method according to claim 1, wherein the chemical composition of perovskite compound comprises La$_{0.6}$Ca$_{0.4}$Co$_{1-x}$Ir$_x$O$_3$ (0.2≦X<1).

* * * * *